United States Patent
Campi

(10) Patent No.: US 11,409,624 B2
(45) Date of Patent: Aug. 9, 2022

(54) EXPOSING AN INDEPENDENT HARDWARE MANAGEMENT AND MONITORING (IHMM) DEVICE OF A HOST SYSTEM TO GUESTS THEREON

(71) Applicant: VMware, Inc., Palo Alto, CA (US)

(72) Inventor: Marcus Armando Benedetto Campi, Menlo Park, CA (US)

(73) Assignee: VMware, Inc., Palo Alto, CA (US)

( * ) Notice: Subject to any disclaimer, the term of this patent is extended or adjusted under 35 U.S.C. 154(b) by 577 days.

(21) Appl. No.: 15/880,835

(22) Filed: Jan. 26, 2018

(65) Prior Publication Data

US 2019/0235983 A1    Aug. 1, 2019

(51) Int. Cl.
*G06F 9/44* (2018.01)
*G06F 11/30* (2006.01)
*G06F 9/4401* (2018.01)
*G06F 9/455* (2018.01)
*G06F 9/54* (2006.01)

(52) U.S. Cl.
CPC ............ *G06F 11/301* (2013.01); *G06F 9/442* (2013.01); *G06F 9/45558* (2013.01); *G06F 9/54* (2013.01); *G06F 11/3062* (2013.01)

(58) Field of Classification Search
CPC .................................................. G06F 11/301
USPC ....................................................... 719/324
See application file for complete search history.

(56) References Cited

U.S. PATENT DOCUMENTS

| | | |
|---|---|---|
| 8,224,934 B1 | 7/2012 | Dongre et al. |
| 8,260,841 B1* | 9/2012 | Maity ................ G06F 11/301 370/438 |
| 8,881,129 B1 | 11/2014 | McKinnon et al. |
| 9,384,018 B2 | 7/2016 | Du |
| 9,766,910 B1* | 9/2017 | Berg .................... G06F 9/455 |
| 2005/0172176 A1 | 8/2005 | Ortiz et al. |
| 2007/0016827 A1* | 1/2007 | Lopez ............... G06F 11/2294 714/31 |
| 2007/0038732 A1* | 2/2007 | Chandwani ........... H04L 41/24 709/223 |
| 2013/0227560 A1 | 8/2013 | McGrath et al. |
| 2014/0019498 A1 | 1/2014 | Cidon et al. |
| 2014/0359610 A1 | 12/2014 | Tian et al. |

* cited by examiner

*Primary Examiner* — Timothy A Mudrick

(57) ABSTRACT

The technology disclosed herein enables a guest executing in a host of a host computing system to access an IHMM device of the host computing system. In a particular embodiment, a method provides, in the host, providing a virtualized IHMM device to a guest IHMM device driver in the guest and exchanging IHMM information between the guest IHMM device driver and the virtualized IHMM device. The method further provides, translating the IHMM information between the virtualized IHMM device and a host IHMM device driver on the host. The host IHMM device driver interacts with the host IHMM device based on the IHMM information.

20 Claims, 6 Drawing Sheets

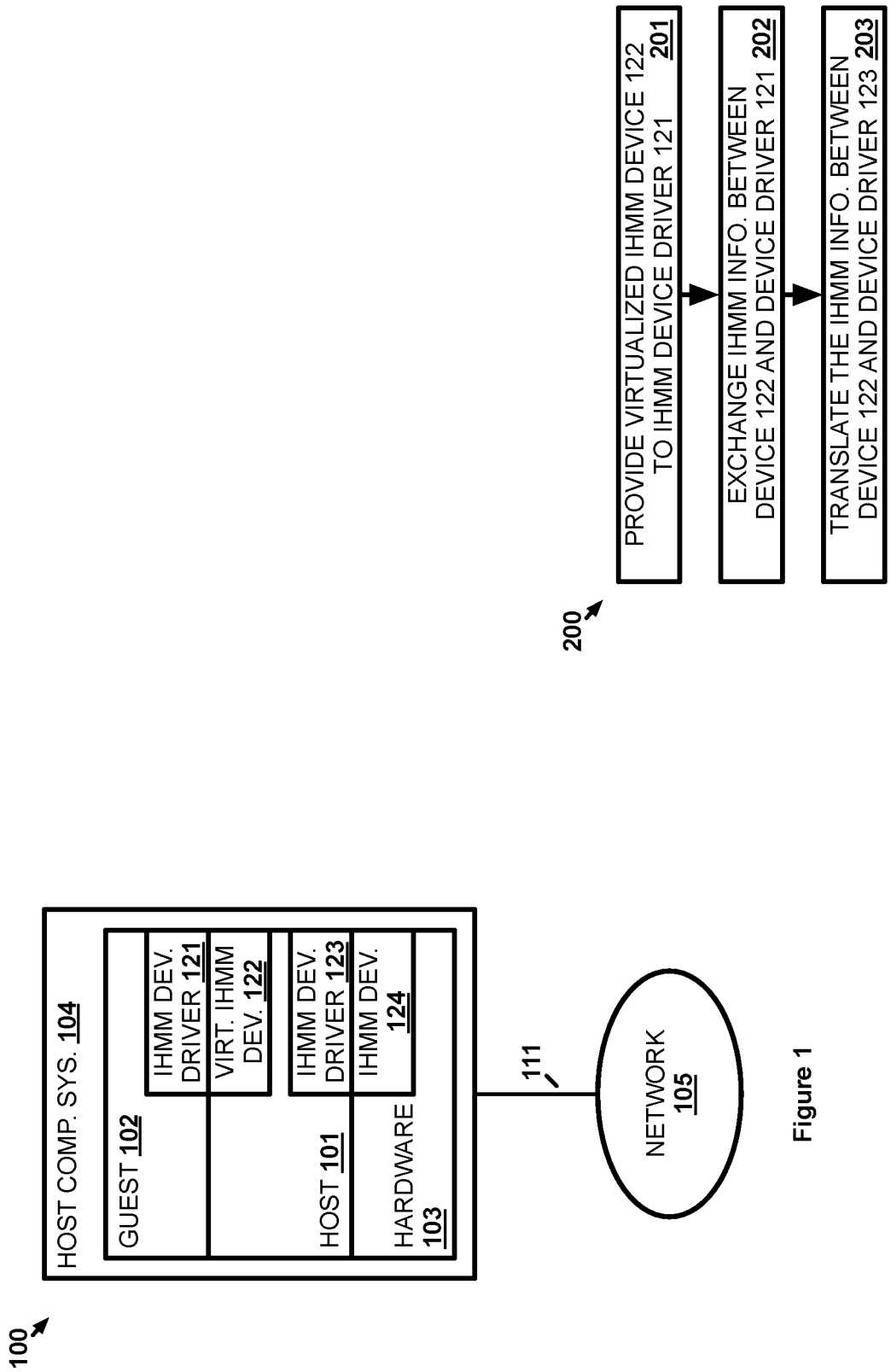

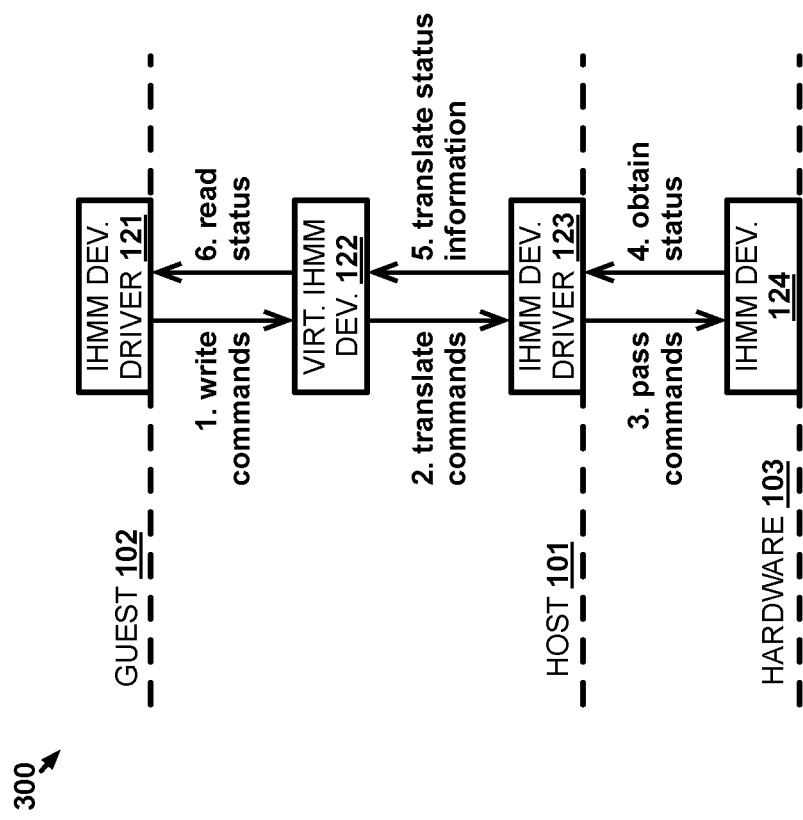

EXPOSING AN INDEPENDENT HARDWARE MANAGEMENT AND MONITORING (IHMM) DEVICE OF A HOST SYSTEM TO GUESTS THEREON

TECHNICAL BACKGROUND

Many computing systems include independent hardware management and monitoring (IHMM) devices thereon to manage and monitor hardware components of a computing system independently of any software, such as an operating system, executing on the computing system. As such, an IHMM device can even provide information before an operating system boots or absent an operating system on the computing system at all, even when the computing system is otherwise in a "powered down" state. An IHMM device may provide information including system temperature information, system fan information, system power information, hardware log information, or some other type of information that may be obtained from various hardware components of a computing system—including combinations thereof. An IHMM device may further assist in recovery procedures, such as commanding the computing system to power down or reboot, configure watchdog timers, or perform some other low level hardware function—including combinations thereof.

A computing system may access an IHMM device via a device driver executing thereon, such as within an operating system, in a manner similar to how other hardware elements, such as storage drives, network cards, video cards, etc., are accessed via device drivers. Alternatively, or additionally, the IHMM device may be accessed over a communication network, such as a local area network (LAN), via an independent connection between the IHMM device and a network interface of the computing system. The network interface and the IHMM device may both remain powered even when the computing system is otherwise in a "powered down" state to allow the IHMM device to be accessed over the network even in such a state. However, when a guest is executing on a computing system, as may be the case when a virtual machine or container is hosted by the computing system, the guest is isolated from the IHMM device of the host computing system and unable to access any of the information/functionality provided thereby.

SUMMARY

The technology disclosed herein enables a guest executing in a host of a host computing system to access an IHMM device of the host computing system. In a particular embodiment, a method provides, in the host, providing a virtualized IHMM device to a guest IHMM device driver in the guest and exchanging IHMM information between the guest IHMM device driver and the virtualized IHMM device. The method further provides, translating the IHMM information between the virtualized IHMM device and a host IHMM device driver on the host. The host IHMM device driver interacts with the host IHMM device based on the IHMM information.

In some embodiments, providing the virtualized IHMM device comprises providing at least one register into which the IHMM information is written and from which the IHMM information is read. In those embodiments, exchanging the IHMM information between the guest IHMM device driver and the virtualized IHMM device may comprise, from the guest IHMM device driver, writing an IHMM request to a command/status register of the at least one register. Further, in those embodiments, translating the IHMM information between the virtualized IHMM device and the host IHMM device driver on the host may comprise converting the IHMM request to a format compatible with the host IHMM device driver and, after converting the IHMM request, passing the IHMM request to the host IHMM device driver. Additionally, the translating may include limiting request types that can be passed to the host IHMM device driver or modifying certain requests to conform the certain requests to hardware expectations of the guest relative to hardware of the host computing system.

In some embodiments, exchanging the IHMM information between the guest IHMM device driver and the virtualized IHMM device comprises writing data associated with the IHMM request to a data in/out register of the at least one register, which may comprise a Keyboard Controller Style (KCS) interface. Likewise, in some embodiments, exchanging the IHMM information between the guest IHMM device driver and the virtualized IHMM device comprises, from the guest IHMM device driver, reading status information about the host IHMM device from the command/status register. In those embodiments, translating the IHMM information between the virtualized IHMM device and the host IHMM device driver on the host comprises, in the host, converting the status information from the host IHMM device driver to a format compatible with the virtualized IHMM device driver and, after converting the status information, writing the status information to a command/status register of the at least one register.

In some embossments, the IHMM device comprises an Intelligent Platform Management Interface (IPMI) device.

In another embodiment, an apparatus is provided having a host IHMM device, one or more computer readable storage media, and a processing system operatively coupled with the one or more computer readable storage media. Program instructions stored on the one or more computer readable storage media, when read and executed by the processing system, direct the processing system to, in the host, provide a virtualized IHMM device to a guest IHMM device driver in the guest and exchange IHMM information between the guest IHMM device driver and the virtualized IHMM device. The program instructions further direct the processing system to translate the IHMM information between the virtualized IHMM device and a host IHMM device driver on the host, wherein the host IHMM device driver interacts with the host IHMM device based on the IHMM information.

In yet another embodiment, one or more computer readable storage media is provided having program instructions stored thereon. The program instructions, when read and executed by a host computing system, direct the host computing system to, in a host, provide a virtualized IHMM device to a guest IHMM device driver in the guest. The program instructions further direct the host to exchange IHMM information between the guest IHMM device driver and the virtualized IHMM device. Also, the program instructions direct the host computing system to translate the IHMM information between the virtualized IHMM device and a host IHMM device driver on the host, wherein the host IHMM device driver interacts with the host IHMM device based on the IHMM information.

BRIEF DESCRIPTION OF THE DRAWINGS

FIG. 1 illustrates an implementation for exposing a host IHMM device to a guest.

FIG. 2 illustrates a scenario for the implementation to expose a host IHMM device to a guest.

FIG. 3 illustrates another scenario for the implementation to expose a host IHMM device to a guest.

DETAILED DESCRIPTION

Figure 4:
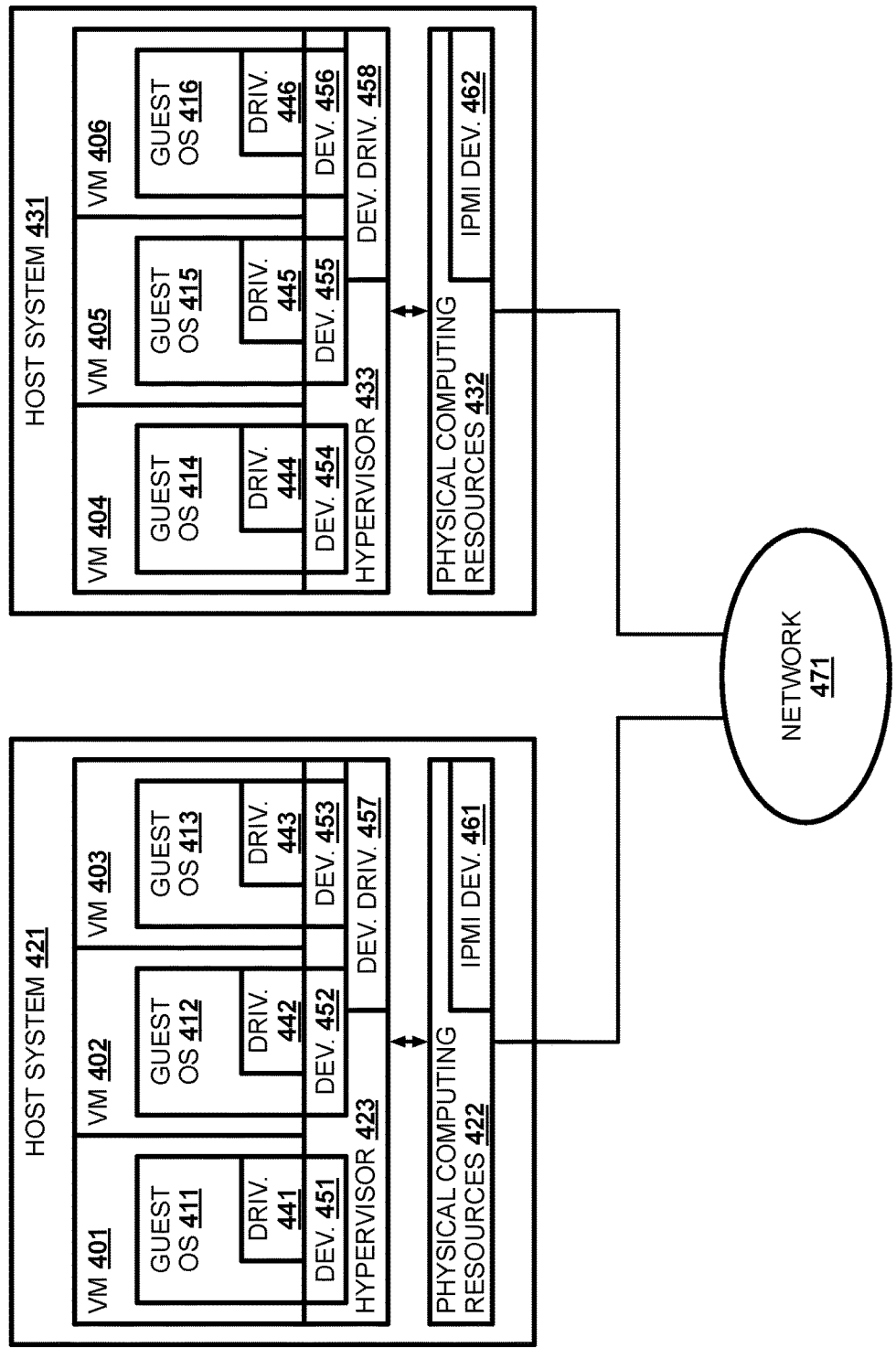
FIG. 4 illustrates another implementation for exposing a host IHMM device to a guest.

An increasing amount of computing functions, such as network based applications, are performed in hosted guests rather than by directly executing those functions on a physical computing system, such as an application server. This typically allows for physical computing systems to be used more efficiently since, for example, a single system may host multiple guests, the guests are not tied to a single physical system, and the number of guests can be scaled. The implementations described herein provide an interface through which a guest can access the IHMM device of a host computing system on which the guest is hosted. The guest may be executing within a virtual machine provided by a host on the host computing system, although other types of guests, such as containers, may make use of the interface as well.

Despite not executing directly on a physical computing system, a guest may benefit from access to at least some of the features provided by an IHMM device. For instance, when trouble shooting why a guest is not performing as expected, it may be useful for an administrator user of the guest to obtain hardware information about the host computing system upon which the guest is running because the hardware information may be indicative of what might be causing the guest's performance issues. Obtaining the hardware information through the host system directly may not be available to the user in situations where the administrator is not authorized to access the host system on which the guest resides. Such situations are becoming more common as computing resources are sold for use by those willing to pay, such as various on-demand cloud computing platforms. The seller of the computing resources would not necessarily provide access to the computing systems that make up those resources. Thus, the administrator is limited to what can be done via the guest.

FIG. 1 illustrates implementation 100 for exposing a host IHMM device to a guest. Implementation 100 includes host computing system 104 and network 105. host computing system 104 includes hardware 103. hardware 103 may comprise processing resources (e.g., processing circuitry, CPU cores, etc.), memory space (e.g., random access memory, hard disk drive(s), flash memory, etc.), network interface circuitry (e.g., one or more wireless/wired network interface cards), user interfaces, or any other type of hardware resource that a physical computing system may include. host computing system 104 connects to network 105 via communication link 111. network 105 comprises wired and/or wireless communication links, routers, switches, or some other type of communication element, including combinations thereof, that allow host computing system 104 to exchange communications with other computing systems.

Hardware 103 further includes host IHMM device 124. Host IHMM device 124 may include a main controller circuit, sometimes called the baseboard management controller (BMC), and may further include additional controller circuits that are responsible for different portions of hardware 103. In some cases, two or more of the controllers may be combined on a single integrated circuit. The controllers communicate with elements of hardware 103 over various system buses and ports provided by hardware 103. In some cases, host IHMM device 124 may be able to communicate over network 105 independently via an independent connection to a network interface of hardware 103. A prevalent set of computer interface specifications for use with host IHMM devices is the Intelligent Platform Management Interface (IPMI) set of specifications, although interfacing with host IHMM device 124 may use a different set of specifications.

In operation, host 101 executes on hardware 103 of host computing system 104 and hosts guest 102. Guest 102 may execute on a virtual machine provided by host 101 or may be some other type of guest, such as a container. Host 101 may therefore comprise a hypervisor and an operating system in which the hypervisor executes, if the hypervisor is of the type that requires an operating system. Guest 102 may likewise include an operating system in which a workload executes or may otherwise not require an operating system. To access host IHMM device 124, host 101 includes host IHMM device driver 123, which, like other types of device drivers, provides a software interface to the host IHMM device 124 hardware component of hardware 103. Using host IHMM device driver 123, host 101 is able to interact with host IHMM device 124, using IPMI or otherwise, to exchange commands and information with host IHMM device 124.

In this example, host 101 further includes virtualized IHMM device 122, which provides the basis for guest 102 to also interact with host IHMM device 124 in ways that would otherwise have only been available to software executing directly on hardware 103 rather than through host 101. Guests executing on hosts are typically provided with virtualized hardware elements, such as memory, processor(s), network interfaces, etc., that are mapped to physical hardware elements by the host. In this case, host 101 further provides virtualized IHMM device 122 in addition to the other virtualized hardware elements that guest 102 requires to operate. As host 101 requires host IHMM device driver 123 to interact with host IHMM device 124, guest 102 includes guest IHMM device driver 121 to interact with virtualized IHMM device 122 provided by host 101. How guest IHMM device driver 121, virtualized IHMM device 122, host IHMM device driver 123, and host IHMM device 124 interact to provided guest 102 with access to host IHMM device 124 is discussed in detail through the examples below.

FIG. 2 illustrates scenario 200 for implementation 100 to expose a host IHMM device to a guest. In scenario 200, host 101 provides virtualized IHMM device 122 to guest IHMM device driver 121 (201). IHMM information is exchanged between virtualized IHMM device 122 and guest IHMM device driver 121 (202). The IHMM information may include information, such as commands, being passed to virtualized IHMM device 122 from guest IHMM device driver 121 and/or information, such as hardware status and command responses, being passed from virtualized IHMM device 122 to guest IHMM device driver 121.

Scenario 200 further provides translating the IHMM information between the virtualized IHMM device and a host IHMM device driver on the host (203). The IHMM information may need to be translated to reformat the information, to limit the commands/status information to which guest 102 has access, to account for other guests executing on host computing system 104, to account for differences between the virtualized hardware provided to guest 102 by host 101 and hardware 103, or for any other reason that host 101 may need to modify IHMM information to account for guest 102. In some cases, it is possible that the translation comprises a pass through of the IHMM information between virtualized IHMM device 122 and host IHMM device driver 123 without needing to modify the information.

Host IHMM device driver 123 may interact with host IHMM device 124 based on the IHMM information. For instance, once a IHMM request (e.g., a CPU temperature request) is translated, host IHMM device driver 123 issues the command to host IHMM device 124. Likewise, host IHMM device driver 123 will receive IHMM information from host IHMM device 124 for translation by host 101. Continuing the above example, the IHMM information may be information provided by host IHMM device 124 in response to the IHMM request (e.g., providing the requested CPU temperature).

Advantageously, while host 101 continues to have the ability to access host IHMM device 124 via host IHMM device driver 123, host 101 further provides guest 102 with access to host IHMM device 124 by virtualizing an IHMM device driver as virtualized IHMM device 122 accessible by guest IHMM device driver 121 in guest 102. The translation step described above, in addition to facilitating the aforementioned access, is able to ensure guest 102 does not overstep when accessing host IHMM device 124. For instance, it is possible that host computing system 104 is hosting more than one guest, if guest 102 were to issue a IHMM request to shut down or restart host computing system 104, then those other guests would likely be adversely effected. The translation step would be able to prevent guest 102 from doing so if so desired by an operator of host computing system 104.

FIG. 3 illustrates scenario 300 for implementation 100 to expose a host IHMM device to a guest. In scenario 300, guest IHMM device driver 121 writes one or more IHMM requests at step 1 to virtualized IHMM device 122. Virtualized IHMM device 122 may be represented to guest IHMM device driver 121 by host 101 as one or more registers to which the commands may be written and from which IHMM information, such as the status information, may be read. The registers may be implemented as a Keyboard Controller Style (KCS) interface, although other conventions may be used. While a physical IHMM device, such as host IHMM device 124 may similarly be accessed using one or more registers, the registers of virtualized IHMM device 122 are not backed by physical hardware. Thus, the registers of virtualized IHMM device 122 simply make it seem to guest IHMM device driver 121 that virtualized IHMM device 122 is a physical hardware element. Instead of being handled by hardware, host 101 obtains the commands written to virtualized IHMM device 122 and translates the commands at step 2 before passing the commands to host IHMM device driver 123.

The commands are then passed at step 3 to host IHMM device 124. The commands received by host IHMM device driver 123 and passed to host IHMM device 124, after translation, are no different from the commands would be had host 101 originally generated the commands. Thus, host IHMM device 124 complies with the commands as it would in the normally in response to commands from host 101.

In this example, at least one of the commands is for status information. Accordingly, host IHMM device 124 provides status information at step 4 to host IHMM device driver 123. As was the case above, host IHMM device driver 123 and host IHMM device 124 interact as they would had host 101 issued the commands originally, rather than guest 102. Thus, host IHMM device 124 provides the status information as it would normally in response to commands from host 101. Upon receiving the status information via host IHMM device driver 123, host 101 translates the status information at step 5 before writing the status information to virtualized IHMM device 122. The status information may be translated for reasons similar to why the commands needed to be translated before being passed to host IHMM device driver 123. Once written to virtualized IHMM device 122, guest IHMM device driver 121 simply reads the status information at step 6 from virtualized IHMM device 122.

FIG. 4 illustrates implementation 400 for exposing a host IHMM device to a guest. In this example, the IHMM elements use IPMI and are therefore referred to as such. Implementation 400 includes host computing system 421, host computing system 431, and physical network 471. Physical network 471 may include the Internet, one or more local area networks, one or more wide area networks, and/or one or more other types of networks between computing systems.

In this example, host computing system 421 executes hypervisor 423, as hosts, to allocate physical computing resources 422 among virtual machines 401-403. Likewise, host computing system 431 executes hypervisor 433 to allocate physical computing resources 432 among virtual machines 404-406. Physical computing resources 422 and 432 may include processing resources (e.g., processing circuitry, CPU time/cores, etc.), memory space (e.g., random access memory, hard disk drive(s), flash memory, etc.), network interfaces, user interfaces, or any other type of resource that a physical computing system may include. Physical computing resources 422 and 432 further include respective IPMI devices 461 and 462. Hypervisor 423 and hypervisor 433 include IPMI device driver 457 and IPMI device driver 458, respectively. Additionally, hypervisor 423 provides virtualized IPMI device 451 to virtual machine 401, virtualized IPMI device 452 to virtual machine 402, and virtualized IPMI device 453 to virtual machine 403. Likewise, hypervisor 433 provides virtualized IPMI device 454 to virtual machine 404, virtualized IPMI device 455 to virtual machine 405, and virtualized IPMI device 456 to virtual machine 406.

It should be understood that the distribution of virtual machines evenly across two host computing systems, as shown in FIG. 4, is merely exemplary. The six virtual machines shown may instead be implemented on any number of host computing systems. Likewise, host computing systems 421 and 431 could host additional hosts (e.g., hypervisors) and virtual machines and/or other virtual elements that are not involved in this example.

Figure 5:
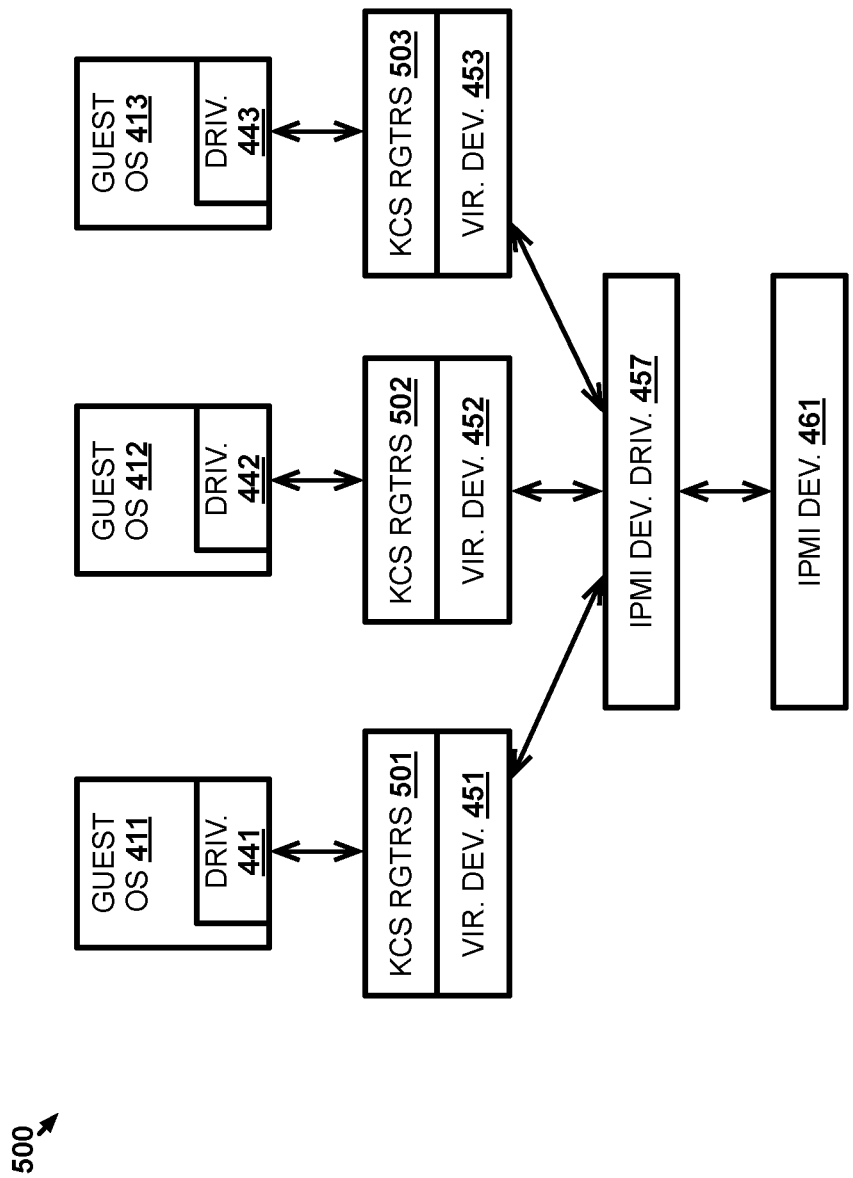
FIG. 5 illustrates a logical arrangement of the other implementation for exposing a host IHMM device to a guest.

FIG. 5 illustrates logical arrangement 500 of implementation 400 for exposing a host IHMM device to a guest. Logical arrangement 500 and the scenarios below focus on elements of host computing system 421, although it should be understood that a similar arrangement may be had for corresponding elements of host computing system 431. Likewise, elements of host computing system 431 may perform in a manner similar to that described below with respect to logical arrangement 500. In logical arrangement 500, virtualized IPMI devices 451-453 provides KCS registers 501-503 to IPMI device drivers 441-443, respectively. KCS registers 501-503 replicate the KCS interface that IPMI device drivers 441-443 would expect to interact with if KCS registers 501-503 were provided by a physical IPMI device. Virtualized IPMI devices 451-453 interact with IPMI device driver 457, which in turn interacts with IPMI device 461. The interactions between IPMI device driver 457 and IPMI device 461 may also use a KCS interface or may use some other type of interface.

Figure 6:
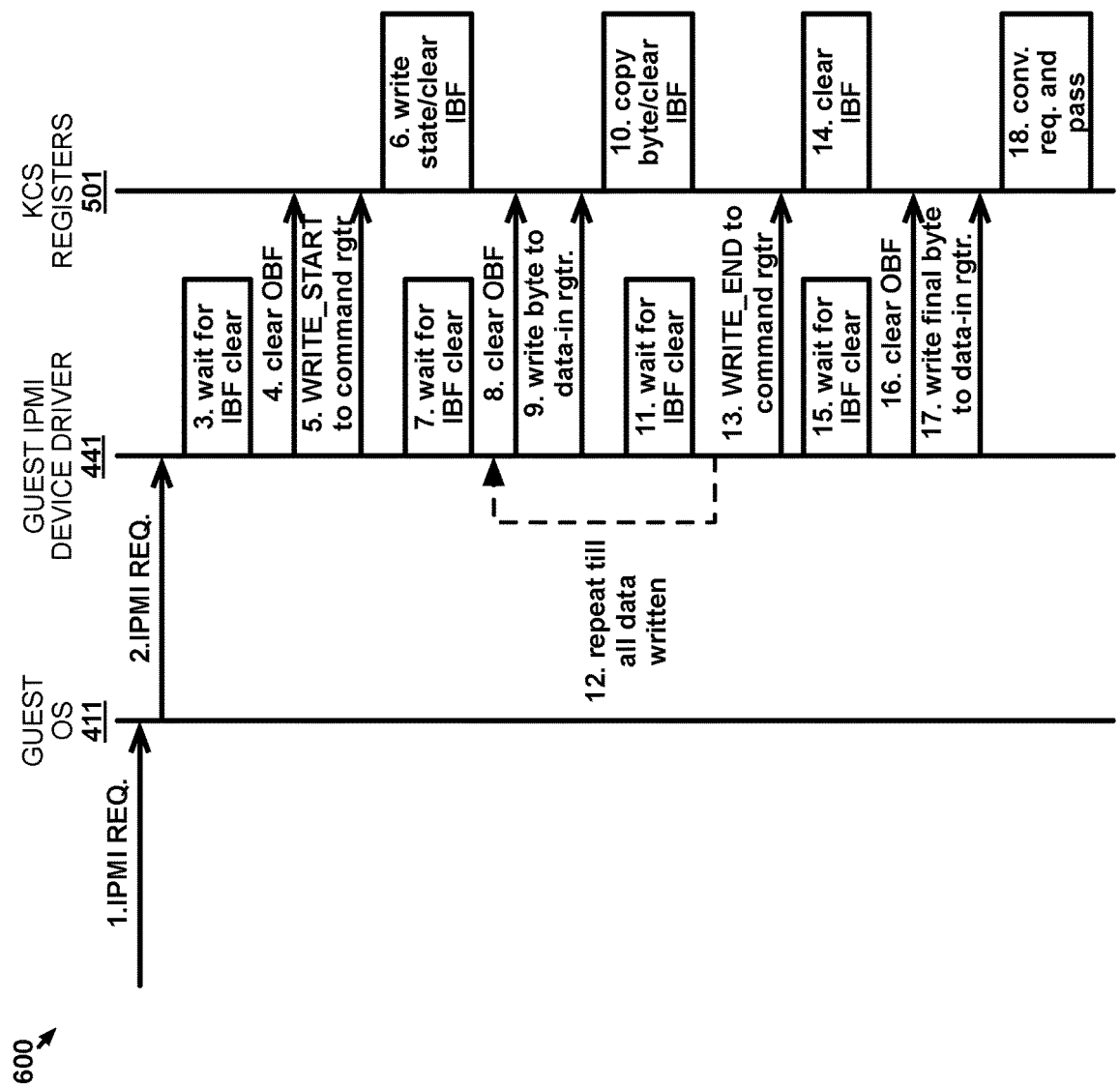
FIG. 6 illustrates a scenario for the other implementation to expose a host IHMM device to a guest.

FIG. 6 illustrates scenario 600 for implementation 400 to expose a host IHMM device to a guest. In particular, scenario 600 describes how a command may be passed from guest OS 411 to KCS registers 501 of virtualized IPMI device 451 via guest IPMI device driver 441. Scenario 600 focuses on guest OS 411, guest IPMI device driver 441, and KCS registers 501, although similar steps may be used by guest OS 412, guest IPMI device driver 443, and KCS registers 502 as well as guest OS 413, guest IPMI device driver 443, and KCS registers 503.

In scenario 600, guest OS 411 receives an IPMI request at step 1. The IPMI request may be received over network 471 from an administrator of guest OS 411, may be automatically generated by guest OS 411, or may be obtained from some other source. Guest OS 411 then provides the IPMI request to guest IPMI device driver 441 at step 2 in a manner consistent with how operating systems typically interact with device drivers. Upon receiving the IPMI request, guest IPMI device driver 441 can begin the process of passing the request as a command to KCS registers 501, which, as far as guest IPMI device driver 441 is concerned, are registers provided by a physical IPMI device. The command is written to KCS registers 501 using the KCS conventions set forth by the IPMI specification.

Specifically, guest IPMI device driver 441 monitors a command/status register at step 3 for an input buffer full (IBF) bit of the command/status register of KCS registers 501 to clear (i.e., set bit to 0). Clearing the IBF bit signifies to guest IPMI device driver 441 that virtualized IPMI device 451 is ready to receive data through KCS registers 501. Also, guest IPMI device driver 441 clears the output buffer full (OBF) bit of the command/status register of KCS registers 501 at step 4. The OBF bit, when set to 1, indicates that data is ready to be read from KCS registers 501 by guest IPMI device driver 441.

Guest IPMI device driver 441 then writes the "WRITE_START" command at step 5 to a command/status register of KCS registers 501. At step 6, the "WRITE_START" command causes virtualized IPMI device 451 to put itself into a WRITE state, wherein virtualized IPMI device 451 is ready to accept bytes of the request through KCS registers 501, and causes virtualized IPMI device 451 to clear the input buffer full (IBF) bit of the command/status register of KCS registers 501 (i.e., set bit to 0). Clearing the IBF bit signifies to guest IPMI device driver 441 that virtualized IPMI device 451 is ready to receive data through KCS registers 501. After issuing the "WRITE_START" command, guest IPMI device driver 441 monitors the command/status register at step 7 for the IBF bit to clear, which indicates to guest IPMI device driver 441 that a data-in register of KCS registers 501 is ready to receive a first byte of the IPMI command.

Before writing a byte of the IPMI request, guest IPMI device driver 441 again clears the OBF bit of the command/status register of KCS registers 501 at step 8. Once the OBF bit is cleared, guest IPMI device driver 441 writes the first byte of the IPMI request at step 9 to the data-in register of KCS registers 501. After the byte has been written, at step 10, virtualized IPMI device 451 copies the byte from the data-in register to a request buffer elsewhere in virtualized IPMI device 451 and again clears the IBF bit of the command/status register. As above, guest IPMI device driver 441 monitors the command/status register and waits until the IBF bit is cleared at step 11 before proceeding with further data writes. Step 12 indicates that steps 8-11 then repeat for subsequent bytes of the IPMI request until all but the final data byte that makes up the IPMI request has been written to KCS registers 501.

Once all but the final byte of the IPMI request has been written to KCS registers 501, guest IPMI device driver 441 then writes the "WRITE_END" command at step 13 to the command/status register of KCS registers 501. As its name implies, the "WRITE_END" command indicates to virtualized IPMI device 451 that guest IPMI device driver 441 is going to end writing the IPMI request to KCS registers 501. In response to the "WRITE_END" command, virtualized IPMI device 451 again clears the IBF bit at step 14 and guest IPMI device driver 441 monitors the command/status register waiting for the IBF bit to clear at step 15. Upon the IBF bit being cleared, guest IPMI device driver 441 again clears the OBF bit of the command/status register of KCS registers 501 at step 16 and then writes the final data byte of the IPMI request to the data-in register of KCS registers 501 at step 17.

Once the final byte is included with the other previously written bytes in the request buffer, the request buffer of virtualized IPMI device 451 now includes the entirety of the IPMI request in the KCS format. At step 18, virtualized IPMI device 451 then converts the request to the OpenIPMI format before passing the IPMI request to IPMI device driver 457, which handles the IPMI request in the same manner it would handle any other IPMI request received in the correct format (OpenIPMI in this case). That is, IPMI device driver 457 uses ioctl system calls to send the IPMI request to IPMI device 461. Guest OS 411, guest IPMI device driver 441, virtualized IPMI device 451, and IPMI device driver 457 all wait for a response from IPMI device 461 to be passed back up the chain, as described below.

In addition to converting the IPMI request to OpenIPMI, virtualized IPMI device 451 may account for other factors when determining whether the IPMI request should further be modified. These other factors may include accounting for differences between the hardware makeup of the virtual machine on which a guest OS is running and the actual makeup of the host computing system. For example, virtual machine 401 may indicate to guest OS 411 that there is two CPU available to guest OS 411 while host computing system 421 includes four CPUs. If the IPMI request from guest OS 411 requests the temperature of all CPUs, guest OS 411 would expect a response back indicating temperatures of only two CPUs. However, unless the IPMI request (or possibly the response to the request) is modified to only include the temperatures of two CPUs (ideally 2 CPUs of host computing system 421 in use by guest OS 411), guest OS 411 may not know how to handle a response indicating temperatures for four CPUs. Similarly, virtualized IPMI device 451 may need to account for the fact that other virtualized IPMI devices 452 and 453 exist for guest OSs 412 and 413, respectively. As such, virtualized IPMI device 451 may need regulate when IPMI requests are passed to IPMI device driver 457 so that requests from different guest OSs do not conflict with one another.

Moreover, there may be certain types of requests that should not be passed to IPMI device driver 457 at all for security reasons or otherwise. For example, guest OS 411 would not necessarily have administrator privileges for host computing system 421, as might be the case if host computing system 421 is part of a cloud computing platform that hosts guests from various clients. Thus, allowing guest OS 411 to issue a command that would effect the operation of host computing system 421 outside of guest OS 411 would likely be undesirable to host computing system 421's operator. In such situations, virtualized IPMI device 451 may be configured to simply ignore the IPMI request, return an error message in response to the IPMI request, or handle the IPMI request itself in some other manner. For example, guest OS 411 may issue an IPMI request to reboot the system upon which guest OS 411 is executing. Virtualized IPMI device 451 may refrain from passing that request on to IPMI device driver 457, which thereby prevents the request from causing the reboot of host computing system 421 and adversely effecting guest OS 412 and guest OS 413 also running thereon. In some cases, virtualized IPMI device 451 may handle the request itself by indicating to hypervisor 423 that guest OS 411 requests that its own virtual machine 401 be rebooted, a task that hypervisor 423 can accomplish without effecting virtual machines 402 and 403.

Virtualized IPMI device 451 may maintain a table, or other type of data structure, that indicates which IPMI requests should be handled in a manner other than simply passing to IPMI device driver 457. For example, the table may identify different types of IPMI requests via a tuple of Network Function (NetFn) and a command code, as defined by IPMI. Virtualized IPMI device 451 can reference the table to determine whether an IPMI command should be passed to IPMI device driver 457 or handled by virtualized IPMI device 451 in some other manner. For instance, in the above example where guest OS 411 requests that host computing system 421 be rebooted, the table would have an entry showing a NetFn of 0x04h and a command code of 0x02h. The table would further indicate an action for virtualized IPMI device 451 to take with the command, such as rebooting virtual machine 401 or responding to the request with an indication that the request does not meet permissions requirements.

Figure 7:
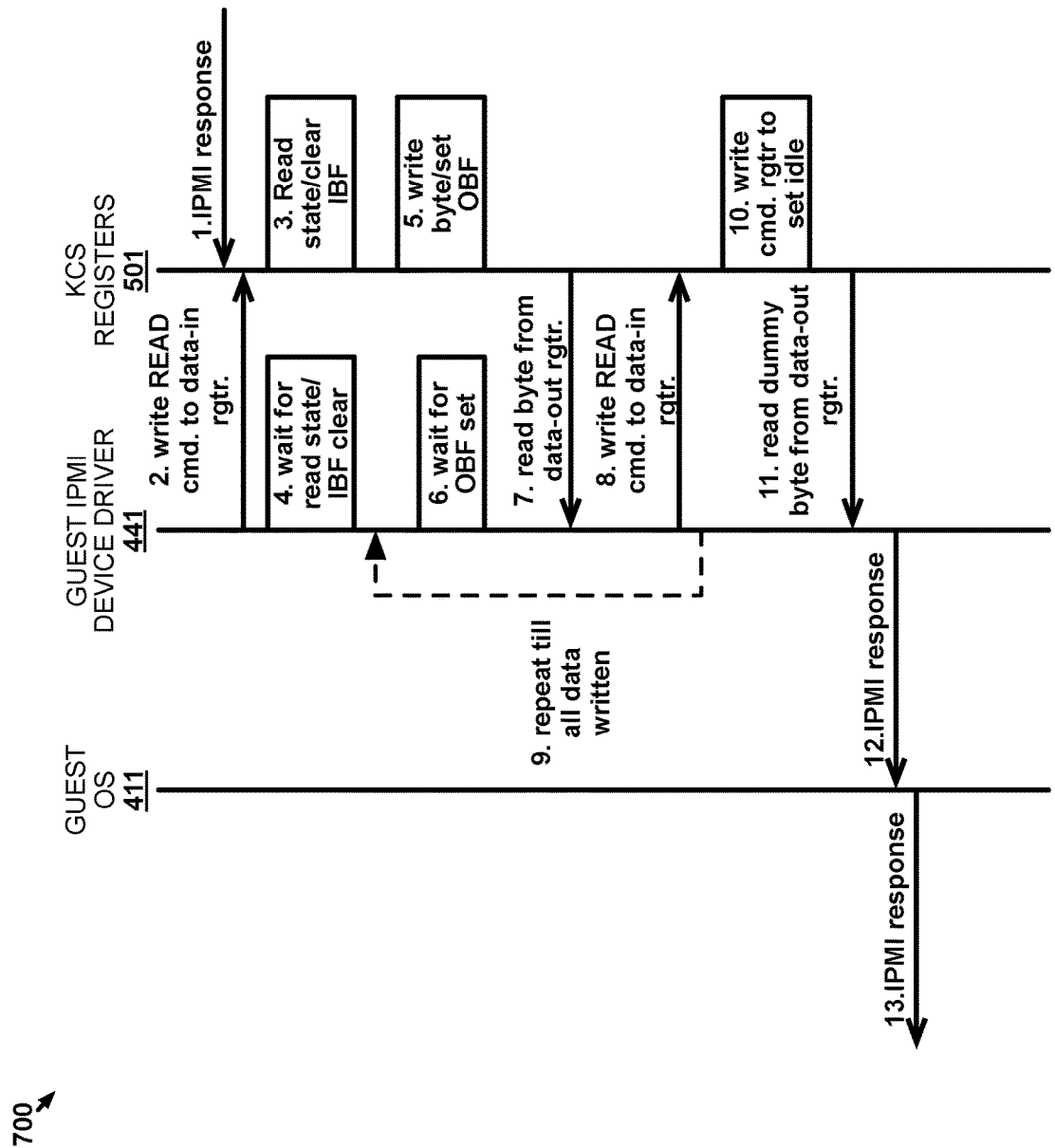
FIG. 7 illustrates a scenario for the other implementation to expose a host IHMM device to a guest.

FIG. 7 illustrates scenario 700 for implementation 400 to expose a host IHMM device to a guest. In particular, scenario 700 describes how responses to IPMI requests are passed from virtualized IPMI device 451 to guest IPMI device driver 441 and then to guest OS 411. At step 1, virtualized IPMI device 451 has received an IPMI response and is ready to pass the response to guest IPMI device driver 441 via KCS registers 501. The response may be received unchanged from IPMI device driver 457 after IPMI device driver 457 received the response from IPMI device 461, virtualized IPMI device 451 may modify the response by converting it from OpenIPMI format to a format used by KCS registers 501, virtualized IPMI device 451 may modify the content of the response, or may change the response in some other manner—including combinations thereof. In one example, rather than modifying the request sent to IPMI device driver 457 in scenario 600 to account for hardware differences between virtual machine 401 and host computing system 421 (e.g., a differing number of CPUs), virtualized IPMI device 451 may instead modify the response.

To begin the process of passing the IPMI response to guest IPMI device driver 441, guest IPMI device driver 441 writes the "READ" command at step 2 to the data-in register of KCS registers 501 and clears the IBF bit. The "READ" command puts virtualized IPMI device 451 into a read state, which also clears the IBF bit, at step 3. Guest IPMI device driver 441 may have written the read command immediately after completing scenario 600 rather than waiting for the IPMI response to be received since guest IPMI device driver 441 knows a response will be forthcoming. After writing the IPMI request in scenario 600, guest IPMI device driver 441 began to wait for KCS registers 501 to go into the read state in order to receive the response to the IPMI request. As such, at step 4, guest IPMI device driver 441 waiting for the read state and for the IBF bit to clear to indicate that the IPMI response is forthcoming. At step 5, virtualized IPMI device 451 writes the first byte of the IPMI response to a data-out register of KCS registers 501 and sets the OBF bit. The data-out and the data-in register in this example are the same register with different designations depending on the direction in which data is being passed (e.g., in or out). Guest IPMI device driver 441 waits at step 6 for the OBF bit to be set as an indication to guest IPMI device driver 441 that a byte of the response can be read. After identifying that the OBF bit has been set, guest IPMI device driver 441 reads the first byte from the data-out register at step 7. Guest IPMI device driver 441 then writes the "READ" command to the data-in register of KCS registers 501 at step 8 to indicate to virtualized IPMI device 451 that the byte has been read. Step 9 indicates that steps 5-8 then repeat for subsequent bytes of the IPMI response until all bytes of the IPMI response have been read by guest IPMI device driver 441.

After all bytes of the IPMI response have been received by guest IPMI device driver 441, virtualized IPMI device 451 sets bits in the command/status register that put virtualized IPMI device 451 into an idle state at step 10 and writes a dummy byte to the data-out register then sets the OBF bit. Guest IPMI device driver 441 reads the dummy byte at step 11 in response to the OBF being set and is able to ignore the byte. Guest IPMI device driver 441 now has the entirety of the IPMI response and passes the IPMI response to guest OS 411 at step 12. In this example, guest OS 411 passes the IPMI response at step 13 on to an entity (e.g., administrator) that made the IPMI request, although guest OS 411 may handle the IPMI response differently in other examples.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method for exposing a host independent hardware management and monitoring (IHMM) device of a host computing system to a guest executing in a host on the host computing system, the method comprising:
    in the host, providing a virtualized IHMM device to a guest IHMM device driver in the guest;
    exchanging IHMM information between the guest IHMM device driver and the virtualized IHMM device; and
    translating the IHMM information between the virtualized IHMM device and a host IHMM device driver on the host, wherein the host IHMM device driver interacts with the host IHMM device based on the IHMM information.

2. The method of claim 1, wherein providing the virtualized IHMM device comprises:

providing at least one register into which the IHMM information is written and from which the IHMM information is read.

3. The method of claim 2, wherein exchanging the IHMM information between the guest IHMM device driver and the virtualized IHMM device comprises:
from the guest IHMM device driver, writing an IHMM request to a command/status register of the at least one register.

4. The method of claim 3, wherein translating the IHMM information between the virtualized IHMM device and the host IHMM device driver on the host comprises:
converting the IHMM request to a format compatible with the host IHMM device driver; and
after converting the IHMM request, passing the IHMM request to the host IHMM device driver.

5. The method of claim 3, wherein translating the IHMM information between the virtualized IHMM device and the host IHMM device driver on the host comprises:
limiting request types that can be passed to the host IHMM device driver; and
modifying certain requests to conform the certain requests to hardware expectations of the guest relative to hardware of the host computing system.

6. The method of claim 3, wherein exchanging the IHMM information between the guest IHMM device driver and the virtualized IHMM device further comprises:
writing data associated with the IHMM request to a data in/out register of the at least one register.

7. The method of claim 2, wherein exchanging the IHMM information between the guest IHMM device driver and the virtualized IHMM device comprises:
from the guest IHMM device driver, reading status information about the host IHMM device from a command/status register of the at least one register.

8. The method of claim 7, wherein translating the IHMM information between the virtualized IHMM device and the host IHMM device driver on the host comprises:
in the host, converting the status information from the host IHMM device driver to a format compatible with the virtualized IHMM device driver; and
after converting the status information, writing the status information to the command/status register.

9. The method of claim 2, wherein the at least one register comprises a Keyboard Controller Style (KCS) interface.

10. The method of claim 1, wherein the IHMM device comprises an Intelligent Platform Management Interface (IPMI) device.

11. An apparatus of a host computing system to expose a host independent hardware management and monitoring (IHMM) device of the host computing system to a guest executing in a host on the host computing system, the apparatus comprising:
the host IHMM device;
one or more computer readable storage media;
a processing system operatively coupled with the one or more computer readable storage media; and
program instructions stored on the one or more computer readable storage media that, when read and executed by the processing system, direct the processing system to:
in the host, provide a virtualized IHMM device to a guest IHMM device driver in the guest;
exchange IHMM information between the guest IHMM device driver and the virtualized IHMM device; and
translate the IHMM information between the virtualized IHMM device and a host IHMM device driver on the host, wherein the host IHMM device driver interacts with the host IHMM device based on the IHMM information.

12. The apparatus of claim 11, wherein to provide the virtualized IHMM device, the program instructions direct the processing system to:
provide at least one register into which the IHMM information is written and from which the IHMM information is read.

13. The apparatus of claim 12, wherein to exchange the IHMM information between the guest IHMM device driver and the virtualized IHMM device, the program instructions direct the processing system to:
from the guest IHMM device driver, write an IHMM request to a command/status register of the at least one register.

14. The apparatus of claim 13, wherein to translate the IHMM information between the virtualized IHMM device and the host IHMM device driver on the host, the program instructions direct the processing system to:
convert the IHMM request to a format compatible with the host IHMM device driver; and
after converting the IHMM request, pass the IHMM request to the host IHMM device driver.

15. The apparatus of claim 13, wherein to translate the IHMM information between the virtualized IHMM device and the host IHMM device driver on the host, the program instructions direct the processing system to:
limit request types that can be passed to the host IHMM device driver; and
modify certain requests to conform the certain requests to hardware expectations of the guest relative to hardware of the host computing system.

16. The apparatus of claim 13, wherein to exchange the IHMM information between the guest IHMM device driver and the virtualized IHMM device, the program instructions further direct the processing system to:
write data associated with the IHMM request to a data in/out register of the at least one register.

17. The apparatus of claim 12, wherein to exchange the IHMM information between the guest IHMM device driver and the virtualized IHMM device, the program instructions direct the processing system to:
from the guest IHMM device driver, read status information about the host IHMM device from a command/status register of the at least one register.

18. The apparatus of claim 17, wherein to translate the IHMM information between the virtualized IHMM device and the host IHMM device driver on the host, the program instructions direct the processing system to:
in the host, convert the status information from the host IHMM device driver to a format compatible with the virtualized IHMM device driver; and
after converting the status information, write the status information to the command/status register.

19. The apparatus of claim 12, wherein the at least one register comprises a Keyboard Controller Style (KCS) interface.

20. One or more computer readable storage media having program instructions stored thereon to expose a host independent hardware management and monitoring (IHMM) device of a host computing system to a guest executing in a host on the host computing system, the program instructions, when read and executed by the host computing system, direct the host computing system to:
in the host, provide a virtualized IHMM device to a guest IHMM device driver in the guest;

exchange IHMM information between the guest IHMM device driver and the virtualized IHMM device; and
translate the IHMM information between the virtualized IHMM device and a host IHMM device driver on the host, wherein the host IHMM device driver interacts with the host IHMM device based on the IHMM information.

* * * * *